(12) United States Patent
He et al.

(10) Patent No.: US 11,021,041 B2
(45) Date of Patent: Jun. 1, 2021

(54) INTEGRATED THERMAL MANAGEMENT SYSTEM

(71) Applicant: FORD GLOBAL TECHNOLOGIES, LLC, Dearborn, MI (US)

(72) Inventors: Jing He, Novi, MI (US); Manfred Koberstein, Troy, MI (US); Loren John Lohmeyer, III, Monroe, MI (US); Jacob Gregory Powers, Livonia, MI (US); Todd Louis Wenzel, Detroit, MI (US); Christian Brent Schoeneman, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 16/444,724

(22) Filed: Jun. 18, 2019

(65) Prior Publication Data

US 2020/0398636 A1 Dec. 24, 2020

(51) Int. Cl.
*B60H 1/00* (2006.01)
*B60H 1/22* (2006.01)
*B60H 1/32* (2006.01)

(52) U.S. Cl.
CPC ..... *B60H 1/00642* (2013.01); *B60H 1/00278* (2013.01); *B60H 1/00392* (2013.01); *B60H 1/00428* (2013.01); *B60H 1/00485* (2013.01); *B60H 1/00492* (2013.01); *B60H 1/00507* (2013.01); *B60H 1/2215* (2013.01); *B60H 1/3207* (2013.01); *B60H 1/3208* (2013.01); *B60H 1/3211* (2013.01); *B60H 2001/0015* (2013.01); *B60H 2001/00614* (2013.01)

(58) Field of Classification Search
CPC ...... B60H 1/00278; B60H 2001/00307; B60H 1/00328; B60H 1/00392; B60H 1/00492; B60H 1/00642; B60H 1/00814; B60H 1/00878; B60H 1/00885; B60H 1/00899; B60H 2001/00928; B60H 2001/00935; B60H 1/14; B60H 1/43; B60H 1/2215; B60H 1/32281; B60H 1/32284; B60H 1/32; B60H 1/323
USPC .................................................. 165/201, 202
See application file for complete search history.

(56) References Cited

U.S. PATENT DOCUMENTS

| | | |
|---|---|---|
| 6,089,034 A | 7/2000 | Lake et al. |
| 8,517,087 B2 | 8/2013 | Zeigler et al. |
| 8,899,062 B2 | 12/2014 | Kadle et al. |
| 9,233,592 B2 | 1/2016 | Larson |
| 9,533,546 B2 | 1/2017 | Cheng |

(Continued)

OTHER PUBLICATIONS

John J. Meyer et al.; "Range Extension Opportunities While Heating a Battery Electric Vehicle"; SAE International; SAE Technicial Paper 2018-01-0066; Apr. 3, 2018; pp. 1-10.

*Primary Examiner* — Frantz F Jules
*Assistant Examiner* — Jason N Thompson
(74) *Attorney, Agent, or Firm* — David Coppiellie; King & Schickli, PLLC

(57) ABSTRACT

An integrated thermal management system includes a cooling circuit having a component thermal conditioning circuit, a battery thermal conditioning circuit, a cabin heating circuit, a cabin cooling circuit and a valve group configured for selectively interconnecting or isolating the component thermal conditioning circuit, the battery thermal conditioning circuit, the cabin heating circuit and the cabin cooling circuit.

12 Claims, 8 Drawing Sheets

(56) References Cited

U.S. PATENT DOCUMENTS

| | | | |
|---|---|---|---|
| 9,533,547 B2 | 1/2017 | Cheng | |
| 9,764,620 B2 | 9/2017 | Liu et al. | |
| 9,879,891 B2 | 1/2018 | Kowsky et al. | |
| 10,046,617 B2 | 8/2018 | Smith et al. | |
| 2010/0293966 A1* | 11/2010 | Yokomachi | B60H 1/02 62/3.2 |
| 2014/0216709 A1* | 8/2014 | Smith | B60H 1/00278 165/287 |
| 2016/0036104 A1* | 2/2016 | Kenney | F28F 13/08 429/120 |
| 2016/0107503 A1* | 4/2016 | Johnston | B60H 1/32284 165/202 |
| 2017/0267063 A1 | 9/2017 | Shan | |
| 2017/0297407 A1 | 10/2017 | Shan | |
| 2017/0361677 A1* | 12/2017 | Kim | B60L 58/24 |
| 2018/0111443 A1* | 4/2018 | Kim | B60H 1/00278 |
| 2018/0117984 A1* | 5/2018 | Kim | B60L 58/26 |
| 2018/0170144 A1* | 6/2018 | Yang | B60H 1/00571 |
| 2018/0197490 A1* | 7/2018 | Guo | G09G 3/3611 |
| 2018/0201094 A1 | 7/2018 | Kawano et al. | |
| 2018/0208061 A1* | 7/2018 | Ben Ahmed | B60L 1/003 |
| 2018/0222287 A1 | 8/2018 | Mieda et al. | |
| 2018/0251011 A1* | 9/2018 | Sugimura | B60H 1/00899 |
| 2019/0176572 A1* | 6/2019 | Kim | B60H 1/00428 |

* cited by examiner

INTEGRATED THERMAL MANAGEMENT SYSTEM

TECHNICAL FIELD

The present invention relates generally to the motor or autonomous vehicle fields and, more particularly, to a new and improved integrated thermal management system in electric vehicles that is holistic in nature and integrates a refrigerant circuit, a battery thermal conditioning circuit, a heating circuit and a cabin cooling circuit together while also providing thermal control of component groups such as drive units and computer electronics.

BACKGROUND

This document relates to a new and improved integrated thermal management system which utilizes multiple three-way and four-way valves in a manner that extends system capabilities to include: (a) cabin heating/cooling/dehumidification, (b) battery cooling with refrigerant capacity control, flow circulation and heating, (c) active or passive cooling of component groups and (d) heat scavenging from component groups and battery pack when used with a heat pump refrigerant system.

Advantageously, the new and improved integrated thermal management system is characterized by improved energy efficiency, enhanced functionality and thermal control synergy. When used in conjunction with a heat pump, the integrated thermal management system facilitates operation of the heat pump and cold ambient due to heat scavenging and delays icing. Further, the coolant-based cabin heat exchangers provide advantage in noise, vibration and harshness (NVH), air stratification, safety, comfort during start/stop and idling, ease of plumbing and controls for auxiliary heating, ventilation and air conditioning (HVAC).

SUMMARY

In accordance with the purposes and benefits described herein, a new and improved integrated thermal management system for a motor or autonomous vehicle comprises a coolant circuit having a component thermal conditioning circuit, a battery thermal conditioning circuit, a cabin heating circuit, a cabin cooling circuit and a valve group. That valve group is configured for selectively interconnecting or isolating the component thermal conditioning circuit, the battery thermal conditioning circuit, the cabin heating circuit and the cabin cooling circuit.

The component thermal conditioning circuit may include a component group, a first coolant pump and a radiator. The component group may include one or more component selected from a first group consisting of an electric drive motor, a DC/DC converter, an onboard charger, an inverter, a light detection and ranging or LIDAR system, computer electronics and combinations thereof.

The battery thermal conditioning circuit may include battery cells, battery cold plates for thermal exchange between battery cells and coolant, and a second coolant pump.

The cabin heating circuit may include heat sources, a first cabin heat exchanger group containing one or more heat exchangers and a third coolant pump. The heat sources may be selected from a second group consisting of a water-cooled condenser, an electric heater, a first thermal storage device and combinations thereof.

The cabin cooling circuit may include a cold source, a second cabin heat exchanger group containing one or more heat exchangers and a fourth coolant pump.

The cold source(s) may be selected from a third group consisting of a chiller, a second thermal storage device and combinations thereof. Still further, the cabin cooling circuit may further include a check valve downstream from the second cabin heat exchanger group.

The valve group may include a first valve between the battery thermal conditioning circuit and the cabin cooling circuit upstream of the cabin cooling circuit and a second valve between the battery thermal conditioning circuit and the cabin cooling circuit downstream of the cabin cooling circuit. The valve group may also include a third valve between the battery thermal conditioning circuit and the component thermal conditioning circuit. Further, the valve group may include a fourth valve between the battery thermal conditioning circuit and the cabin heating circuit. Still further, the valve group may include a fifth valve in the component thermal conditioning circuit upstream of the radiator and a radiator bypass line of the component thermal conditioning circuit. The first valve, the second valve and the fifth valve may be three-way valves while the third valve and the fourth valve may be four-way valves. Valves may be combined to serve the same function as those shown here.

The coolant circuit may also include a degas device adapted for removing gas from the coolant in the coolant lines.

The integrated thermal management system may further include a control module configured for controlling operation of the valve group, the first pump, the second pump, the third pump and the fourth pump. More particularly, that control module may include a controller having control logic configured or adapted for this purpose.

More particularly, the control module may be configured to operate the integrated thermal management system in a plurality of operating modes. That plurality of operating modes includes a first cooling mode wherein the component thermal conditioning circuit, the battery thermal conditioning circuit, the cabin heating circuit and the cabin cooling circuit are all isolated from one another by the valve group.

The plurality of operating modes also includes a second cooling mode wherein the component thermal conditioning circuit and the cabin heating circuit are isolated and coolant from the battery thermal conditioning circuit is metered through the first valve into the cabin cooling circuit and the coolant from the cabin cooling circuit is metered through the second valve into the battery thermal conditioning circuit.

Still further, the plurality of operating modes may include a third cooling mode wherein the cabin heating circuit is isolated, the component thermal conditioning circuit and the battery thermal conditioning circuit are interconnected by flow of the coolant through the third valve and the degas device and the coolant is metered through the cabin cooling circuit by the second valve. In the third cooling mode, the fifth valve also directs the coolant around the radiator through the radiator bypass line.

The plurality of operating modes may also include a heating mode wherein the cabin heating circuit is isolated, the component thermal conditioning circuit and the battery thermal conditioning circuit are interconnected and the first valve and the second valve direct the coolant from the battery thermal conditioning circuit through the cold source without circulating coolant through the second cabin heat exchanger group. In the heating mode, the fifth valve also directs the coolant around the radiator through the radiator bypass line.

The plurality of operating modes also includes a dehumidification and reheat mode wherein the component thermal conditioning circuit and the cabin heating circuit are isolated and the coolant from the battery thermal conditioning circuit is metered through the first valve into the cabin cooling circuit and the coolant from the cabin cooling circuit is metered through the second valve into the battery thermal conditioning circuit.

Still further, the plurality of operating modes includes a battery and cabin preconditioning mode wherein the component thermal conditioning circuit and the cabin cooling circuit are isolated and the battery thermal conditioning circuit and the cabin heating circuit are interconnected by the fourth valve. Such a mode can be operated periodically upon instructions of the control module or, for example, upon receiving a remote start signal from a remote starting device.

In accordance with an additional aspect, a method of integrated thermal management for a vehicle is provided. That method comprises the step of providing a coolant circuit having a component thermal conditioning circuit, a battery thermal conditioning circuit, a cabin heating circuit, a cabin cooling circuit and a valve group. That valve group is configured for selectively interconnecting or isolating the component thermal conditioning circuit, the battery thermal conditioning circuit, the cabin heating circuit and the cabin cooling circuit.

The method may include the step of providing the component thermal conditioning circuit with a first coolant pump, the battery thermal conditioning circuit with a second coolant pump, the cabin heating circuit with a third coolant pump and the cabin cooling circuit with a fourth coolant pump. Further the method may include controlling operation of the valve group with a control module. Still further the method may include the step of controlling operation of the first coolant pump, the second pump, the third coolant pump and the fourth coolant pump with the control module.

More particularly, the method may include the step of providing a first valve of the valve group between the battery thermal conditioning circuit and the cabin cooling circuit upstream of the cabin cooling circuit. Further the method may include the step of providing a second valve of the valve group between the battery thermal conditioning circuit and the cabin cooling circuit downstream of the cabin cooling circuit.

Still further, the method may include the step of providing a third valve of the valve group between the battery thermal conditioning circuit and the component thermal conditioning circuit. The method may also include the step of providing a fourth valve of the valve group between the battery thermal conditioning circuit and the cabin heating circuit. In addition, the method may include the step of using three-way valves for the first valve and the second valve. Further, the method may include the step of using four-way valves for the third valve and the fourth valve.

Still further, the method may include the step of configuring the control module to operate the integrated thermal management system in a plurality of operating modes. This includes providing a first cooling mode, a heating mode, a dehumidification and reheat mode, and a battery and cabin preconditioning mode. Still further, the method may also include the step of providing a second cooling mode and even a third cooling mode.

The first cooling mode may include the step of isolating the component thermal conditioning circuit, the battery thermal conditioning circuit, the cabin heating circuit and the cabin cooling circuit from one another by the valve group.

The second cooling mode may include the steps of isolating the component thermal conditioning circuit and the cabin heating circuit, metering coolant through the first valve from the battery thermal conditioning circuit to the cabin cooling circuit and metering the coolant through the second valve from the cabin cooling circuit to the battery thermal conditioning circuit.

The third cooling mode may include the steps of isolating the cabin heating circuit, interconnecting the component thermal conditioning circuit and the battery thermal conditioning circuit by flow of the coolant through the third valve and a degas device and metering the coolant through the second cabin heat exchanger group by the second valve.

The heating mode may include the steps of isolating the cabin heating circuit, interconnecting the component thermal conditioning circuit and the battery thermal conditioning circuit and directing the coolant from the battery thermal conditioning circuit through a cold source of the cabin cooling circuit without circulating the coolant through a cabin heat exchanger of the cabin cooling circuit. In addition, the heating mode may further include the step of directing the coolant around a radiator of the component thermal conditioning circuit by operation of a fifth valve of the valve group.

The dehumidification and reheat mode may include the steps of isolating the component thermal conditioning circuit and the cabin heating circuit, metering the coolant from the battery thermal conditioning circuit to the cabin cooling circuit by the first valve and metering the coolant from the cabin cooling circuit to the battery thermal conditioning circuit by the second valve.

The battery and cabin precondition mode may include the steps of isolating the component thermal conditioning circuit and the cabin cooling circuit and interconnecting the battery thermal conditioning circuit and the cabin heating circuit with the fourth valve.

In the following description, there are shown and described several preferred embodiments of the integrated thermal management system and the related method of integrated thermal management for a vehicle. As it should be realized, the integrated thermal management system and method are capable of other, different embodiments and their several details are capable of modification in various, obvious aspects all without departing from the integrated thermal management system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the integrated thermal management system and method of integrated thermal management for a vehicle and together with the description serve to explain certain principles thereof.

Reference will now be made in detail to the present preferred embodiments of the integrated thermal management system and method of integrated thermal management for a vehicle, examples of which are illustrated in the accompanying drawing figures.

DETAILED DESCRIPTION

Figure 1:
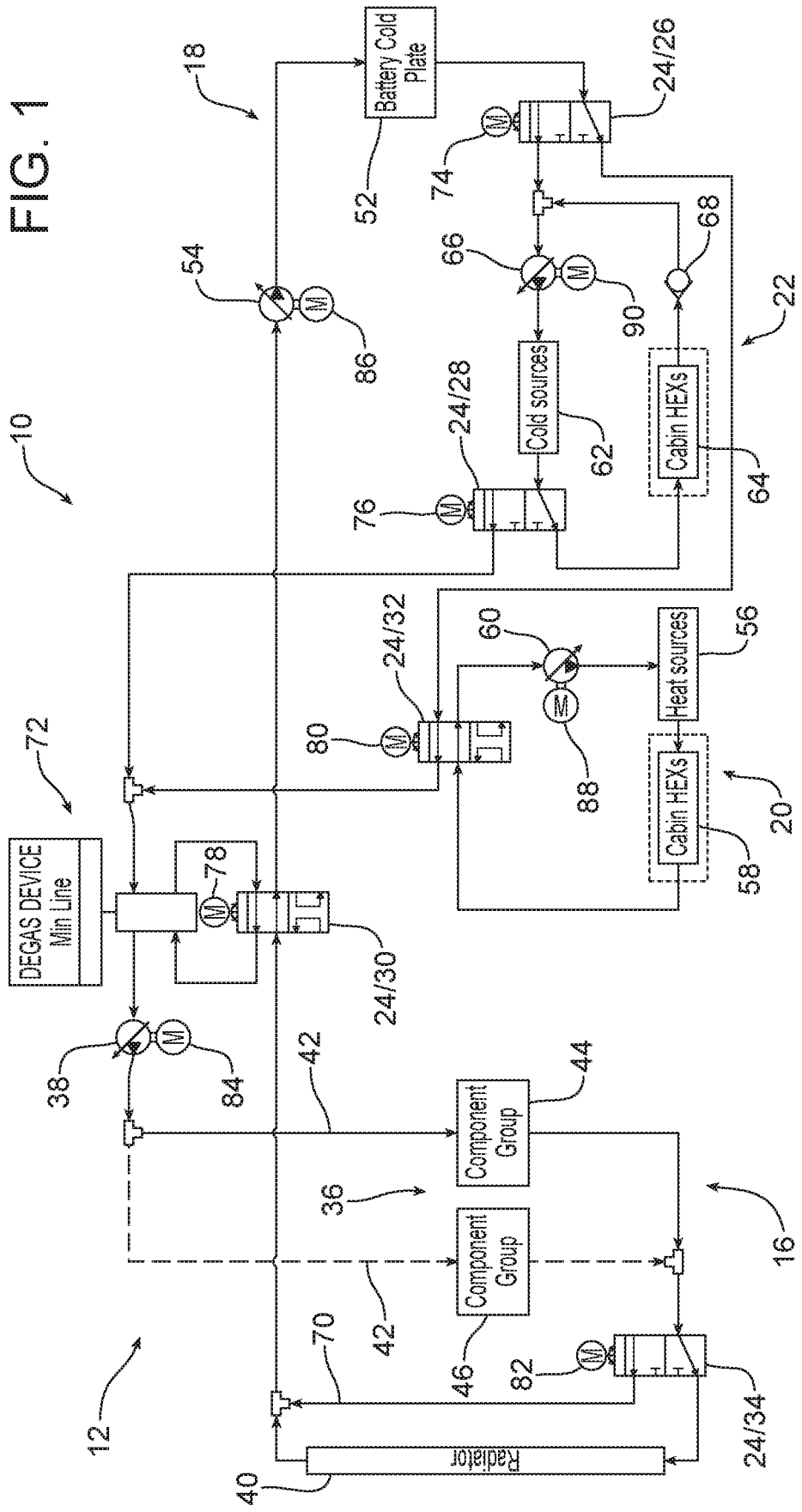
FIG. 1 is a schematic block diagram of the coolant circuit of the integrated thermal management system including the component thermal conditioning circuit, the battery thermal conditioning circuit, the cabin heating circuit, the cabin cooling circuit and the valve group configured for selectively interconnecting or isolating the various loops.
Figure 2:
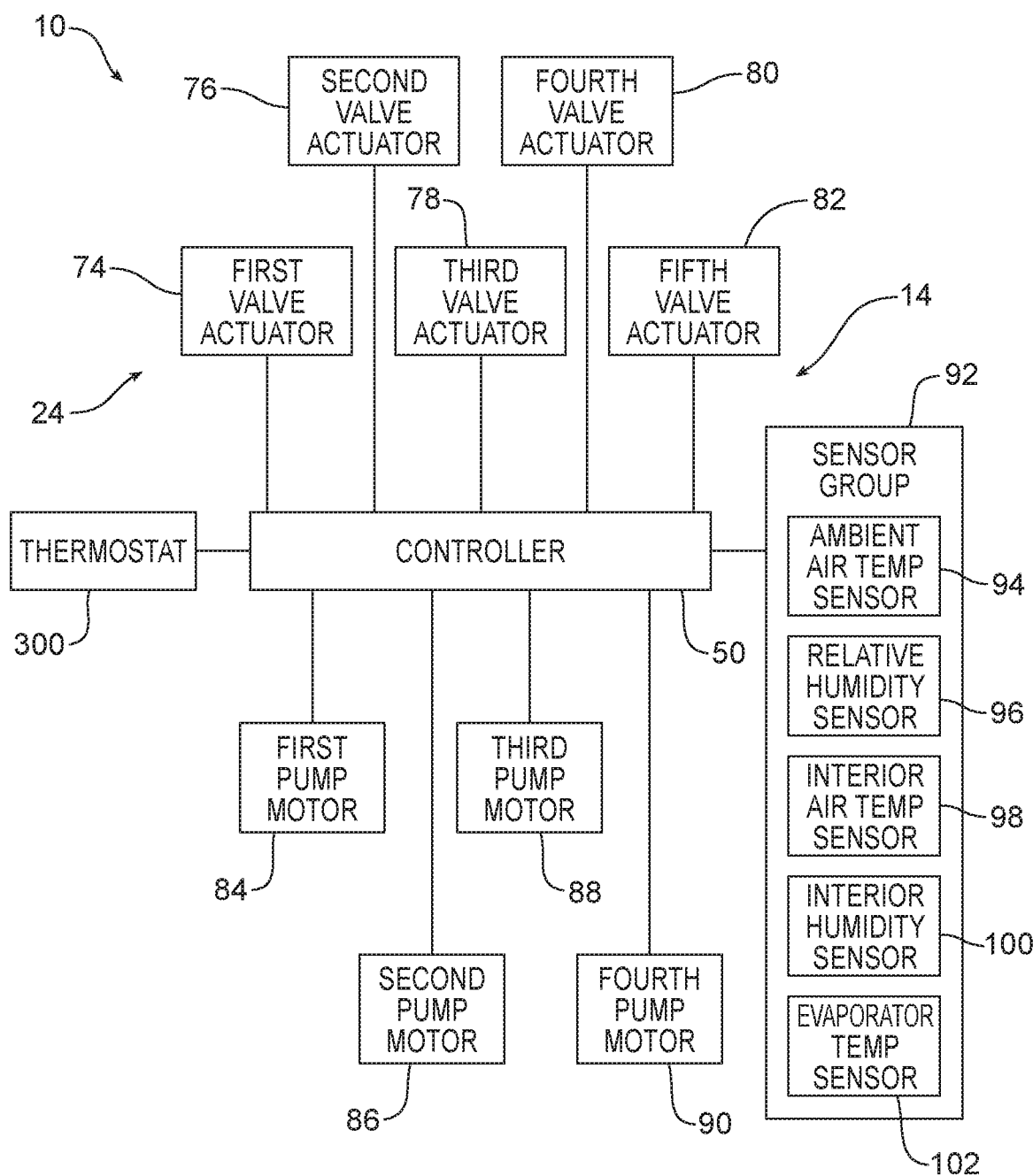
FIG. 2 is a schematic block diagram of the control module of the integrated thermal management system.

Reference is now made to FIGS. 1 and 2 illustrating a new and improved integrated thermal management system 10. That integrated thermal management system 10 includes the coolant circuit 12, generally illustrated in FIG. 1, and the control module 14 generally illustrated in FIG. 2.

With reference to FIG. 1, the coolant circuit 12 includes a component thermal conditioning circuit 16, a battery thermal conditioning circuit 18, a cabin heating circuit 20 and a cabin cooling circuit 22. The four circuits 16, 18, 20, 22 are integrated for the circulation of a coolant by means of the valve group, generally designated by reference numeral 24 (see also FIG. 2). As will be described in greater detail below, that valve group 24 includes a first valve 26, a second valve 28, a third valve 30, a fourth valve 32 and fifth valve 34. As described herein, the valve group 24 is configured for selectively interconnecting or isolating the component thermal conditioning circuit 16, the battery thermal conditioning circuit 18, the cabin heating circuit 20 and the cabin cooling circuit 22.

The coolant circulated through the coolant circuit 12 may comprise any number of different coolants of a type known in the art to be useful for circulation in a vehicle coolant system including, but not necessarily limited to, an ethylene glycol and water coolant mixture.

The component thermal conditioning circuit 16 of the coolant circuit 12 may be more particularly described as including a component group generally designated by reference numeral 36, a first coolant pump 38 and a radiator 40 providing ram air-to-coolant heat exchange. The component group 36 may include any number of vehicle components such as components selected from a first group consisting of an electric drive motor, a DC/DC converter, an on-board charger, an inverter, a LIDAR system, computer electronics and combinations thereof.

In the illustrated embodiment, the component group 36 is broken up into two subgroups provided along two parallel coolant lines 42. The first subgroup 44 may include, for example, the electric drive motor, the DC/DC converter, the inverter and an on-board charger all associated with the powertrain of the vehicle. The second subgroup 46 may include, for example, the LIDAR system and the computer electronics including the controller 50 of the control module 14. That controller 50 may comprise a computing device such as a dedicated microprocessor or an electronic control unit (ECU) operating in accordance with instructions from appropriate control software. Thus, the controller 50 may comprise one or more processors, one or more memories and one or more network interfaces all in communication with each other over one or more communication buses.

The battery thermal conditioning circuit 18 of the illustrated embodiment may include battery cells (not sketched), battery cold plates 52 for thermal exchange between battery cells and coolant, and a second coolant pump 54.

The cabin heating circuit 20 of the illustrated embodiment includes one or more hot or heat sources 56, a first cabin heat exchanger group 58 for coolant-cabin air heat exchange and a third coolant pump 60. Heat sources 56 include, but are not necessarily limited to, a second group consisting of a water cooled condenser, an electric heater, a first thermal storage device of a type known in the art and combinations thereof.

The cabin cooling circuit 22 includes one or more cold sources 62, a second cabin heat exchanger group 64 for coolant-cabin air heat exchange and a fourth coolant pump 66. As further illustrated in FIG. 1, the cabin cooling circuit 22 may also include a check valve 68 downstream from the second cabin coolant-to-air heat exchanger group 64. Possible cold sources 62 include but are not necessarily limited to a third group consisting of a chiller, a second thermal storage device and combinations thereof.

Referring to FIGS. 1 and 2, the valve group 24 will now be described in greater detail. In the illustrated embodiment, the first valve 26, the second valve 28 and the fifth valve 34 are all three-way valves while the third valve 30 and the fourth valve 32 are four-way valves.

The first valve 26 is located between the battery thermal conditioning circuit 18 and the cabin cooling circuit 22 upstream of the cabin cooling circuit. The second valve 28 is located between the battery thermal conditioning circuit 18 and the cabin cooling circuit 22 downstream from the cabin cooling circuit.

The third valve 30 is located between the battery thermal conditioning circuit 18 and the component thermal conditioning circuit 16. The fourth valve 32 is located between the battery thermal conditioning circuit 18 and the cabin heating circuit 20. The fifth valve 34 is in the component thermal conditioning circuit 16 upstream from the radiator 40 and a radiator bypass line 70 of the component thermal conditioning circuit.

As should also be appreciated from viewing FIG. 1, the integrated thermal management system 10 and, more particularly, the coolant circuit 12 also includes a degas device 72 of a type known in the art which functions to eliminate entrapped gas from the coolant circulating through the coolant circuit 12. That degas device 72 is located between the component thermal conditioning circuit 16 and the battery thermal conditioning circuit 18.

Reference is now made to FIG. 2 which illustrates the control module 14 including the controller 50. The control module 14 and, more particularly, the controller 50 of the control module 14 is configured with control logic for controlling operation of the valve group 24 and the various coolant pumps 38, 54, 60 and 66. More particularly, the controller 50 is connected to a first valve actuator 74 for controlling operation of the first valve 26, a second valve actuator 76 for controlling operation of the second valve 28, a third valve actuator 78 for controlling operation of the third valve 30, a fourth valve actuator 80 for controlling operation of the fourth valve 32 and a fifth valve actuator 82 for controlling operation of the fifth valve 34. The controller 50 is also connected to a first pump motor 84 for controlling operation of the first coolant pump 38, a second pump motor 86 for controlling operation of the second coolant pump 54, a third pump motor 88 for controlling operation of the third coolant pump 60 and a fourth pump motor 90 for controlling operation of the fourth coolant pump 66.

As further illustrated in FIG. 2, the controller 50 is also connected to a sensor group, generally designated by reference numeral 92. The sensor group 92 includes various sensors of a type known in the art that are adapted to provide useful data for the operation of the climate control system of the motor vehicle. Such sensors may include, but are not necessarily limited to, an ambient air temperature sensor 94, a relative humidity sensor 96, an interior air temperature sensor 98, an interior humidity sensor 100 and an evaporator temperature sensor 102.

As will be made more apparent from viewing FIGS. 3-8, the control module 14 is configured to operate the integrated thermal management system 10 in a plurality of different operating modes. More particularly, those plurality of operating modes include a first cooling mode illustrated in FIG. 3, a second cooling mode illustrated in FIG. 4, a third cooling mode illustrated in FIG. 5, a heating mode illustrated in FIG. 6, a dehumidification and reheat mode illustrated in FIG. 7 and a battery and cabin preconditioning mode illustrated in FIG. 8.

Figure 3:
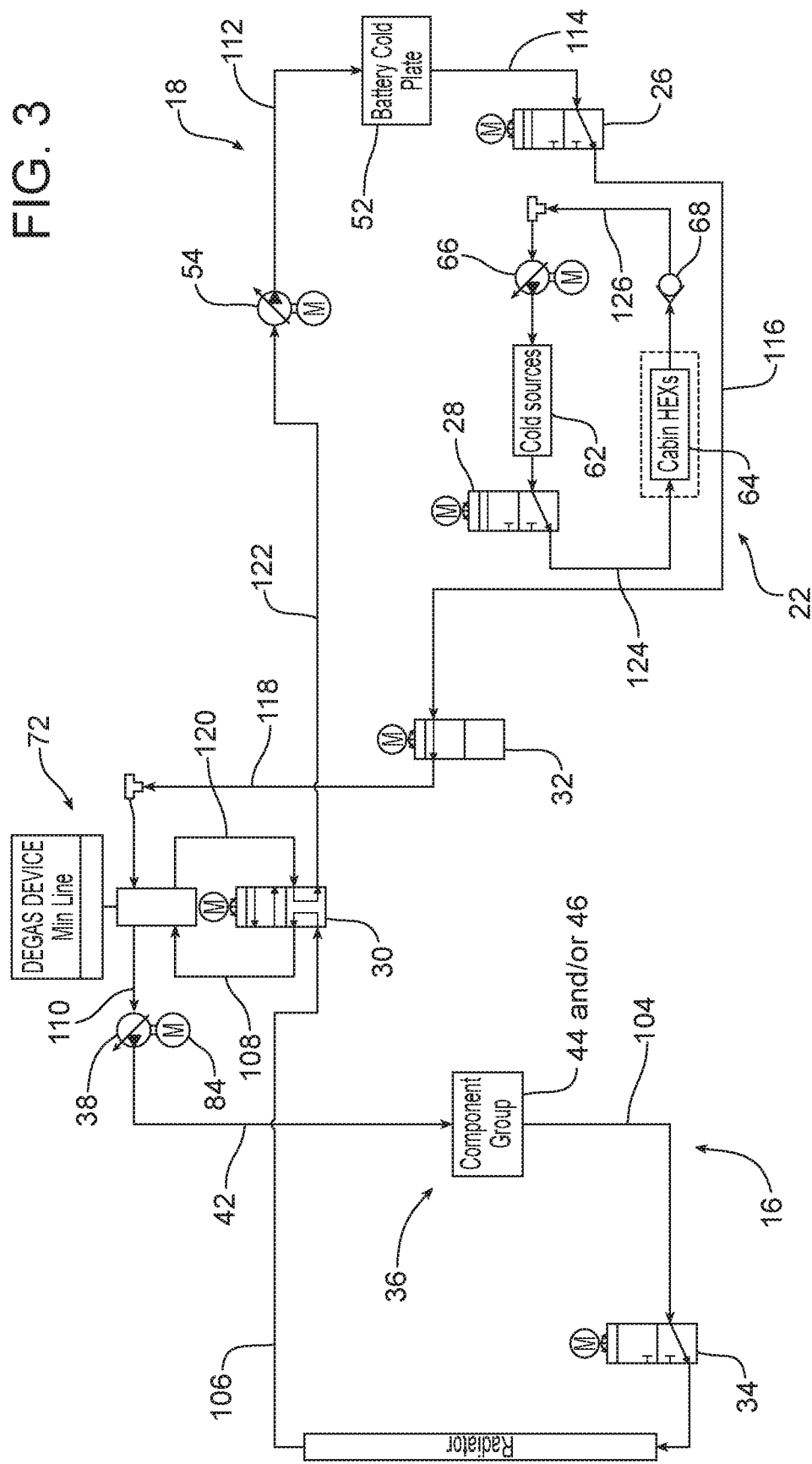
FIG. 3 is a schematic illustration of the coolant circuit illustrated in FIG. 1 operating in the first cooling mode.

Reference is now made to FIG. 3 illustrating in detail operation of the integrated thermal management system 10 in a first cooling mode wherein the component thermal conditioning circuit 16, the battery thermal conditioning circuit 18, the cabin heating circuit 20 and the cabin cooling circuit 22 are all isolated from one another by the valve group 24. More particularly, coolant is forced through the coolant line 42 through the component group 36 including either one or both of the component subgroups 44, 46. That coolant then travels through coolant line 104 to the fifth valve 34 where that coolant is then directed through the radiator 40. Coolant from the radiator 40 is then directed through the line 106 through the third valve 30. The coolant is then directed through the degas device 72 back to the inlet of the first coolant pump 38. Note lines 108 and 110. The cycle is then repeated.

Coolant in the battery thermal conditioning circuit 18 is forced by the second coolant pump 54 along the coolant line 112 to the battery cold plate 52 and then through line 114 to the first valve 26. First valve 26 then directs the coolant through the coolant line 116 to the fourth valve 32. From there the coolant is directed through the coolant line 118 through the degas device 72 and then through the coolant line 120 through the third valve 30 and then back to the inlet of the second coolant pump 54 to repeat the cycle.

The cabin heating circuit is not illustrated in FIG. 3 as it is completely isolated from all other loops by the fourth valve 32 and no coolant is being circulated through the cabin heating circuit 20 by the third coolant pump 60.

As further illustrated in FIG. 3, the cabin cooling circuit 22 is also fully isolated and coolant in that loop is being circulated by the fourth coolant pump 66 through the cold sources 62 and then through the second valve 28. Next, the coolant is directed through the coolant line 124 to the second cabin heat exchanger group 64 for heat exchange with cabin air. The coolant then flows past the check valve 68 back to the inlet port of the fourth coolant pump 66 thorough coolant line 126.

In the first cooling mode, maximum cooling is being provided from the cold sources 62 to the cabin air through cabin air/coolant heat exchange at the second cabin heat exchanger group 64. The radiator 40 is also providing passive cooling to the component group 36 through ram air-coolant heat exchange. Some minimum amount of cooling and temperature equalization among battery cells are also being provided to the batteries of the vehicle by circulation of coolant through the battery cold plate or heat sink 52 by the second coolant pump 54.

Figure 4:
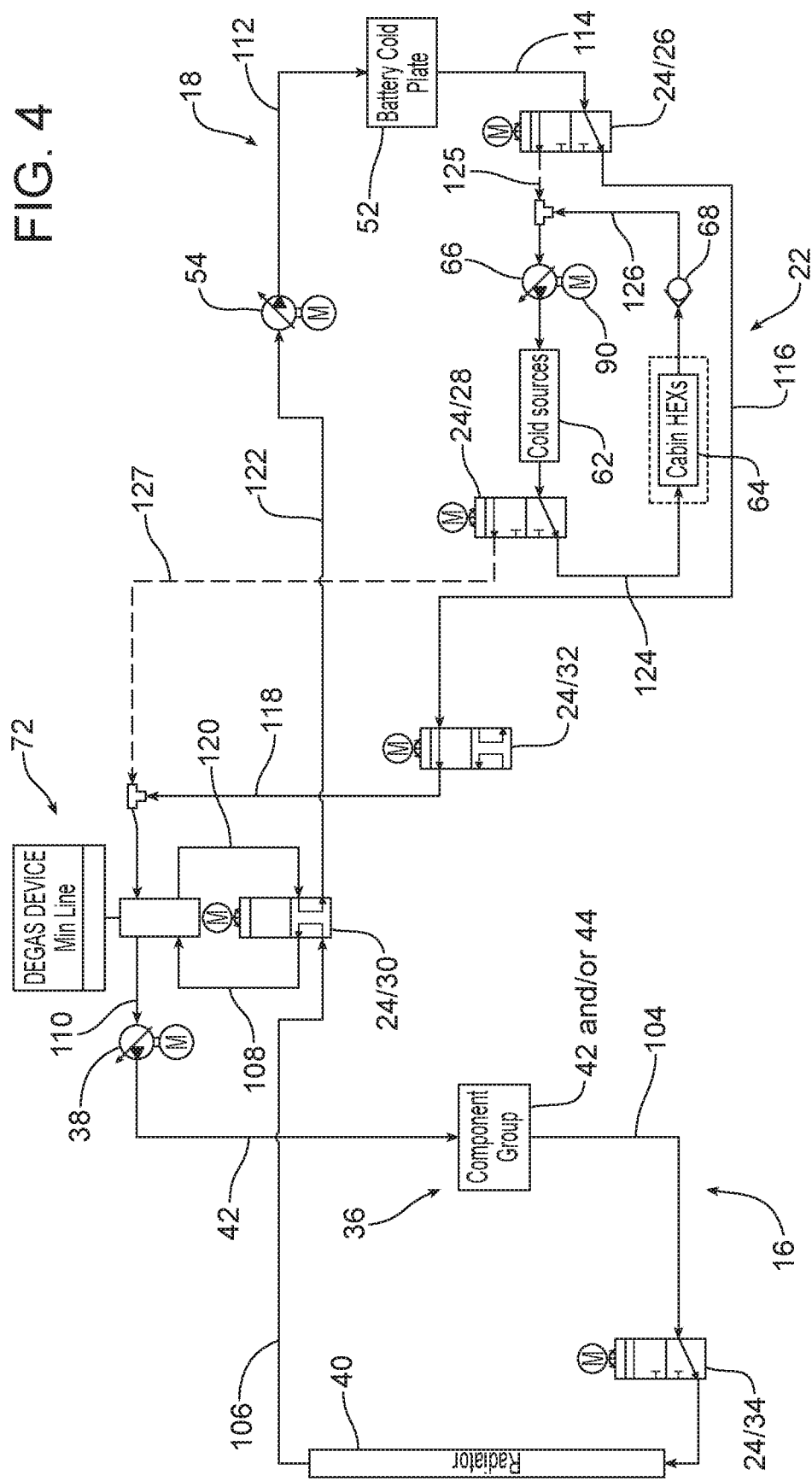
FIG. 4 is a schematic illustration of the coolant circuit of FIG. 1 operating in the second cooling mode.

Reference is now made to FIG. 4 which illustrates a second cooling mode wherein the component thermal conditioning circuit 16 and the cabin heating circuit 20 are again isolated. However, coolant from the battery thermal conditioning circuit 18 is being metered through the first valve 26 into the cabin cooling circuit 22. In addition, coolant from the cabin cooling circuit 22 is being metered through the second valve 28 back to the battery thermal conditioning circuit 18 (note arrow heads on the dashed coolant lines 125 and 127). Also note the arrowheads on the coolant lines 104, 106, 108, 110, 112, 114, 116, 118, 120, 122, 124, and 126 illustrating the flow of coolant through the coolant circuit including the various loops 16, 18 and 22. Again, the cabin heating circuit 20 is not illustrated in FIG. 4 as it is isolated and no coolant is being circulated through the cabin heating circuit 20 by the third coolant pump 60.

By metering the flow of coolant between the battery thermal conditioning circuit 18 and the cabin cooling circuit 22, by operation of the first valve 26 and second valve 28 under the control of the control module 14 (including particularly the controller 50), it is possible to provide a desired amount of active cooling to the battery cells (not shown). More particularly, coolant circulated through the battery thermal conditioning circuit 18 by the second coolant pump 54 in this embodiment draws some cold from the cold sources 62 in the cabin cooling circuit 22 for the cooling of the battery cells through the battery cold plate 52. Thus, cooling provided by the cold sources 62 is shared between the cabin cooling circuit 22 for cooling the cabin of the vehicle and the battery thermal conditioning circuit 18 for cooling the battery of the vehicle in this second cooling mode. At the same time, passive cooling is still being provided to the component group 36 by means of ram air at the radiator 40.

Figure 5:
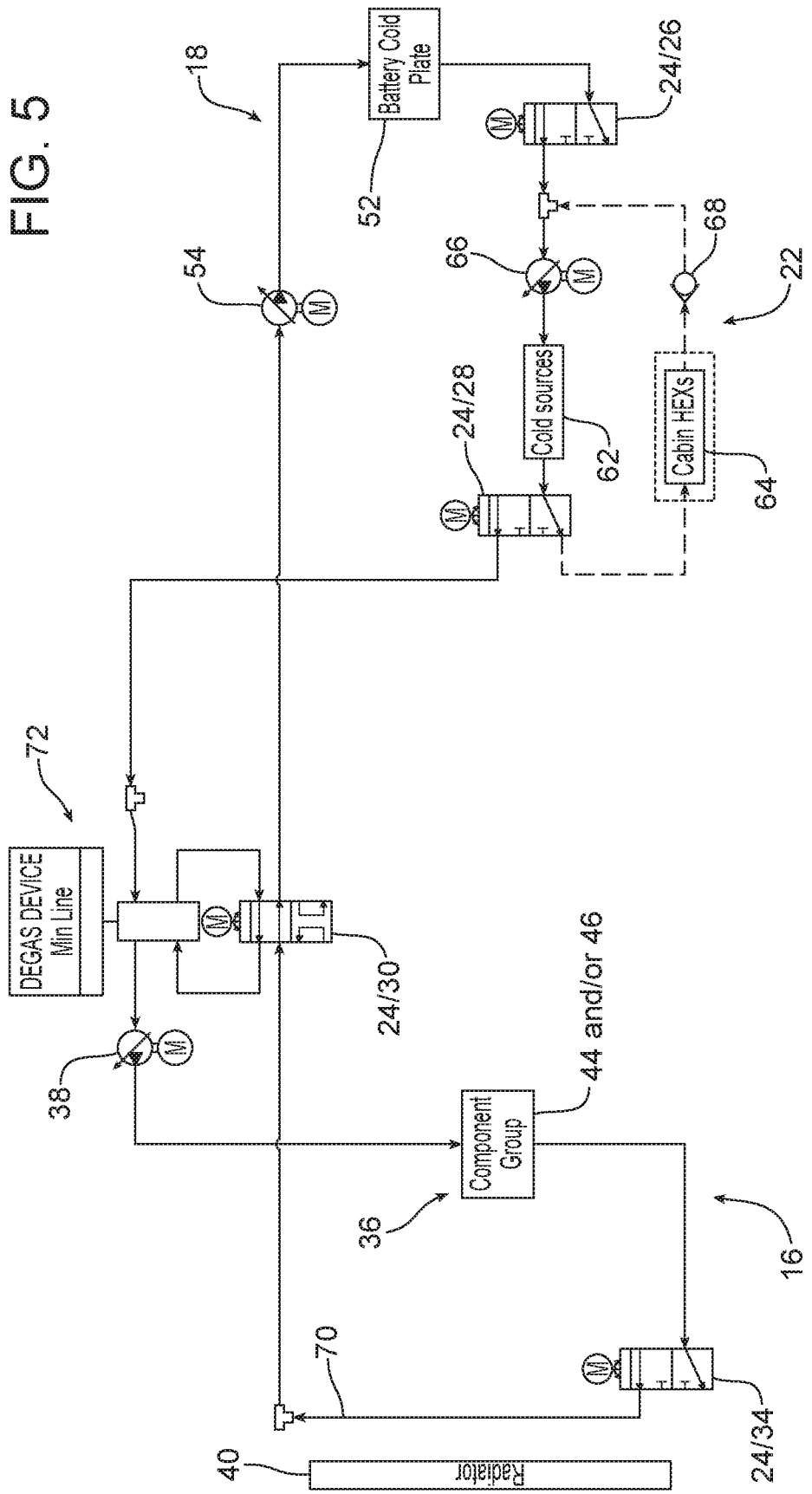
FIG. 5 is a schematic illustration of the coolant circuit illustrated in FIG. 1 operating in the third cooling mode.

Reference is now made to FIG. 5 which illustrates the third cooling mode. In the third cooling mode once again the cabin heating circuit 20 is isolated. Once again, that cabin heating circuit 20 is not illustrated as the third coolant pump 60 is not activated to circulate any coolant through the cabin heating circuit 20. As further illustrated in FIG. 5, in the third cooling mode, the component thermal conditioning circuit 16 and the battery thermal conditioning circuit 18 are interconnected by the flow of coolant through the third valve 30 and the degas device (note coolant line arrows). As a result, the component thermal conditioning circuit 16, the battery thermal conditioning circuit 18 and the cabin cooling circuit 22 are all interconnected for the flow of coolant and cold from the cold sources 62 is utilized to provide active cooling to the component group 36, the battery cells through the battery cold plate 52 and the cabin air at the second cabin heat exchanger group 64. More particularly, the fourth coolant pump 66 pushes coolant through the cold sources 62 where that coolant is cooled. A portion of the coolant is metered through the second valve 28 to the second cabin heat exchanger group 64 where cabin air is cooled. That portion of the coolant metered through the second cabin heat exchanger group 64 is then returned to the fourth coolant pump 66 with the check valve 68 preventing any backflow.

The remaining portion of the cold coolant discharged from the cold sources 62 is directed by the second valve 28 through the degas device 72 to the inlet of the first coolant pump 38. The coolant is then directed through the component group 36 including the first component subgroup 44 and/or the second component subgroup 46. That coolant then passes through the fifth valve 34 which directs the coolant through the bypass line 70 to bypass the radiator 40. The coolant is then returned through the third valve 30 to the inlet or input port of the second coolant pump 54. That second coolant pump 54 pushes the coolant through the battery cold plate 52 to cool the battery cells. The coolant is then returned through the first valve 26 to the inlet port of the fourth coolant pump 66 where the cycle is repeated.

Figure 6:
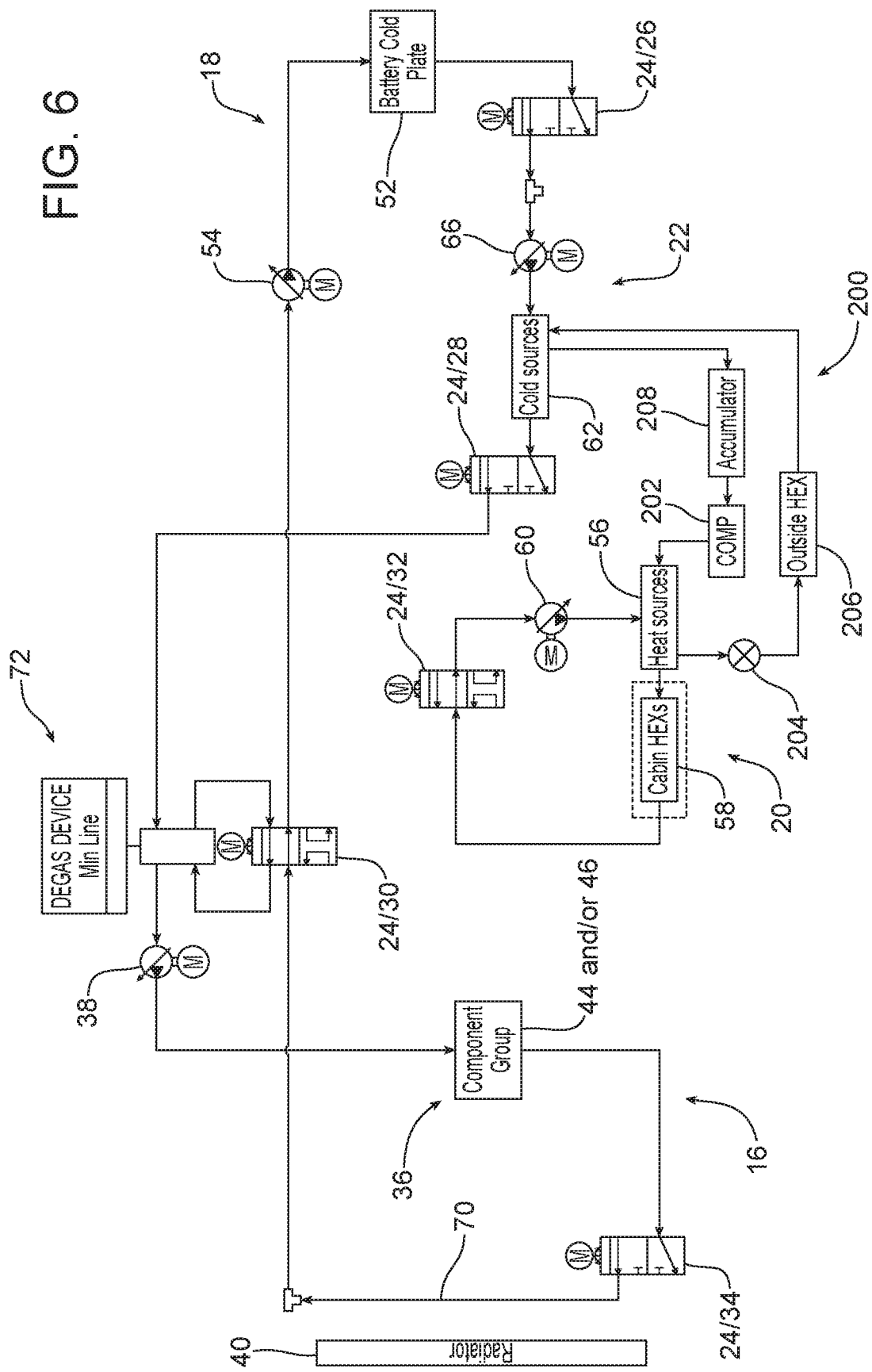
FIG. 6 is a schematic illustration of the coolant circuit illustrated in FIG. 1 operating in the heating mode.

Reference is now made to FIG. 6 which illustrates the heating mode wherein the cabin heating circuit 20 is isolated, the component thermal conditioning circuit 16 and the battery thermal conditioning circuit 18 are interconnected and the first valve 26 and the second valve 28 direct coolant from the battery thermal conditioning circuit through the cold source 62 without circulating coolant through the second cabin heat exchanger group 64 of the cabin cooling circuit 22. See coolant lines with arrows showing the flow of coolant through the coolant circuit 12.

More particularly, the third coolant pump 60 circulates coolant through the heat sources 56 where that coolant is heated. The coolant is then directed through the first cabin heat exchanger group 58 where the coolant is in heat exchange relationship with the cabin air and provides heating of the cabin air. The coolant in the cabin heating circuit 20 is then directed through the fourth valve 32 back to the inlet port of the third coolant pump 60 where the cycle continues. Coolant in the interconnected component thermal conditioning circuit 16, the battery thermal conditioning circuit 18 and the cabin cooling circuit 22 is forced by the first coolant pump 38 through the component group 36 including the first component subgroup 44 and/or the second component subgroup 46 where cooling is provided to the component group and heat is scavenged. The coolant then passes through the fifth valve 34 bypassing the radiator 40 through the bypass line 70. The coolant then travels through the third valve 30 to the inlet port of the second coolant pump 54. The second coolant pump 54 then pushes the coolant through the battery cold plate 52 where heat is scavenged from the battery. The coolant is then directed through the first valve 26 to the inlet port of the fourth coolant pump 66. The coolant is then pushed through the cold sources 62, the second valve 28 and the degas device 72 back to the inlet port of the first coolant pump 38 where the cycle is repeated.

As further illustrated in FIG. 6, a refrigerant circuit designated by reference numeral 200 as part of a heat pump system is shown as one possible embodiment of heating operation with heat scavenging. The refrigerant circuit 200 includes a refrigerant compressor 202 which compresses refrigerant into high pressure, high temperature vapor and discharges hot refrigerant into the heat sources 56, which in this embodiment may be a water-cooled condenser to cool hot refrigerant vapor into liquid. That refrigerant liquid then passes through the expansion device/expansion valve 204 and gets expanded into low pressure, low temperature vapor-liquid mix and flows to an outside heat exchanger 206. The outside heat exchanger 206 may function as an evaporator to absorb heat from ambient air in the heating mode and warm the vapor-liquid refrigerant mix. The refrigerant mix is then directed to the cold sources 62 to further absorb heat from the component group 36 in the component thermal conditioning circuit 16 and the battery cells through the battery cold plate 52 in the battery thermal conditioning circuit 18. The refrigerant out of the cold sources 62, in the form of vapor-liquid mix or pure vapor, is then returned through the accumulator 208 to the compressor 202 where the refrigerant cycle is repeated. Advantageously, the scavenged heat from the component group 36 and the battery cells allows for improved energy efficiency as well as extended operational ambient and delayed icing of the outside heat exchanger 206 thereby providing an overall improvement in thermal control synergy.

Figure 7:
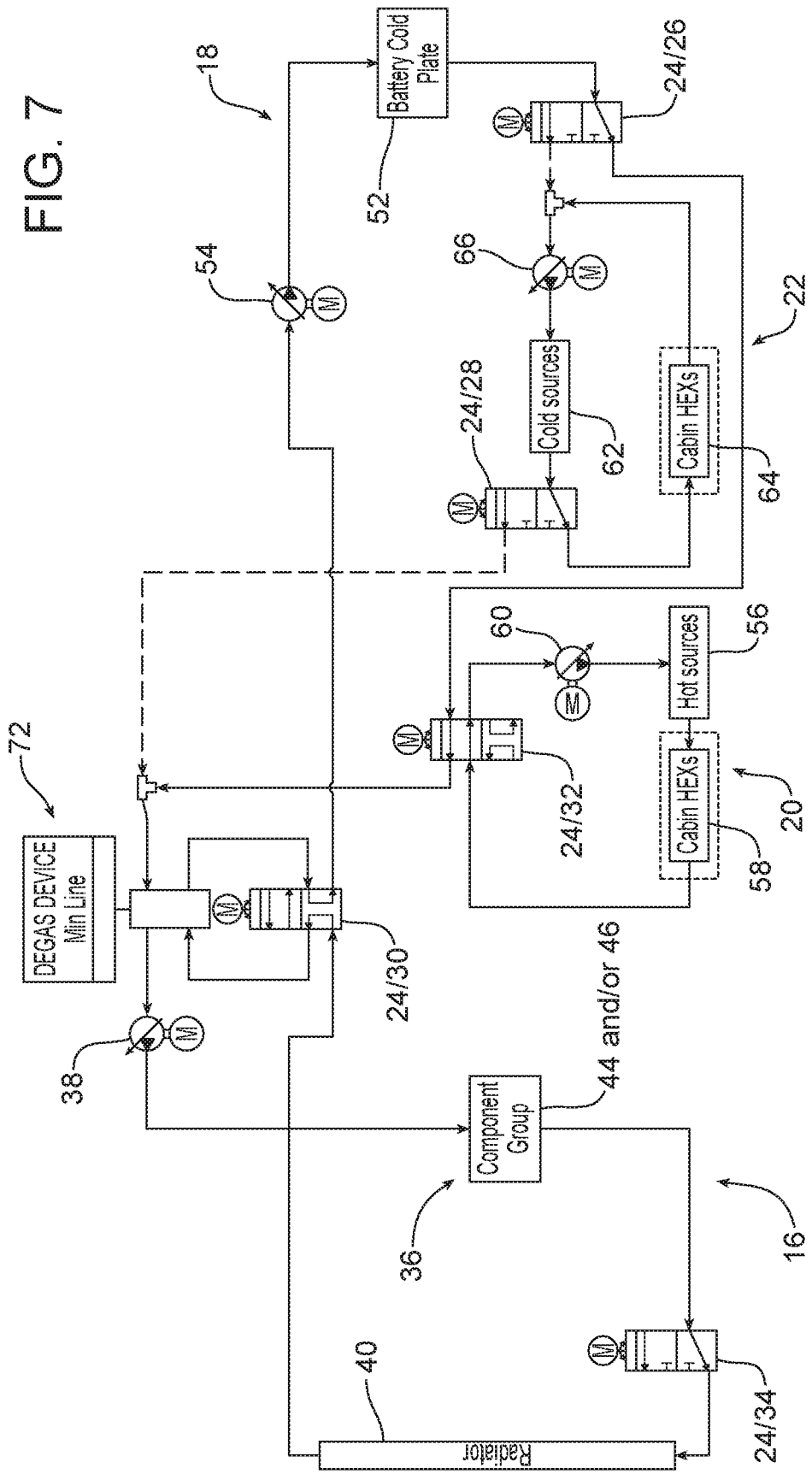
FIG. 7 is a schematic illustration of the coolant circuit illustrated in FIG. 1 operating in the dehumidification and reheat mode.

Reference is now made to FIG. 7 which illustrates the dehumidification and reheat mode. In this mode, the component thermal conditioning circuit 16 and the cabin heating circuit 20 are isolated while coolant from the battery thermal conditioning circuit 18 is metered through the first valve 26 into the cabin cooling circuit 22 and the coolant from the cabin cooling circuit is metered through the second valve 28 back to the battery thermal conditioning circuit. Note particularly the action arrows on the coolant lines showing the circulation path. Coolant flowing through the cabin cooling circuit 22 provides dehumidification of cabin air at the second cabin heat exchanger group 64. That dehumidified cabin air is then heated by the coolant flowing through the cabin heating circuit 20 at the first cabin heat exchanger group 58 located downstream from the second cabin heat exchanger group 64. Here it should be appreciated that the control module 14, ensures that the cabin air is properly dehumidified and heated to provide and then maintain a desired cabin temperature as set by the motor vehicle operator through the thermostat 300 connected to the controller 50. See also FIG. 2.

Figure 8:
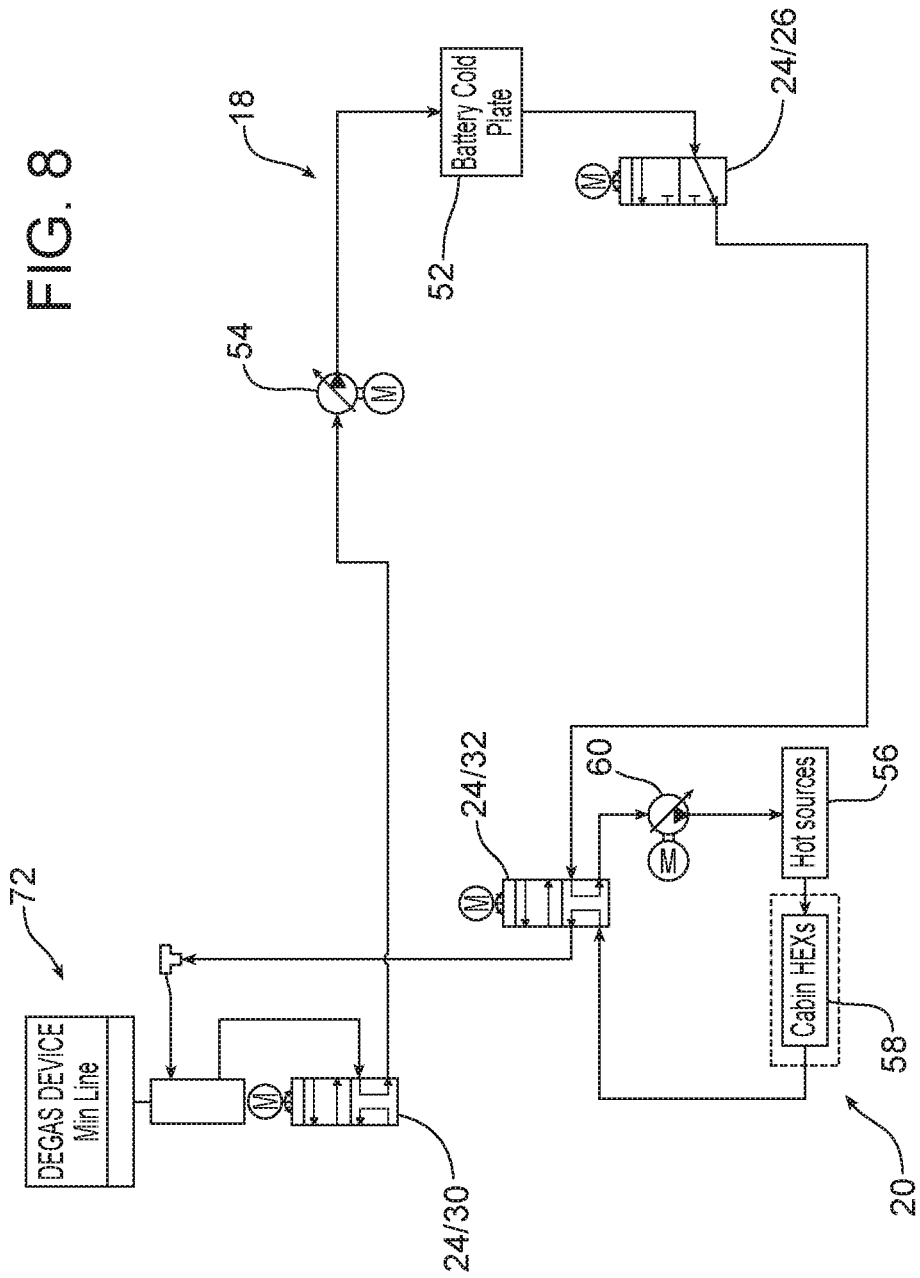
FIG. 8 is a schematic illustration of the coolant circuit illustrated in FIG. 1 operating in the battery and cabin preconditioning mode.

Reference is now made to FIG. 8 illustrating the integrated thermal management system 10 operating in battery and cabin preconditioning mode. In this mode, the component thermal conditioning circuit 16 and the cabin cooling circuit 22 are both isolated. The component thermal conditioning circuit 16 and cabin cooling circuit 22 are not illustrated in FIG. 8, however, because the first coolant pump 38 and the fourth coolant pump 66 are not activated and no coolant is being circulated through those two circuits.

As illustrated in FIG. 8, the battery thermal conditioning circuit 18 and the cabin heating circuit 20 are interconnected by the fourth valve 32. Thus, coolant is pushed by the third coolant pump 60 through the heat sources 56 where the coolant is heated. The heated coolant is then pushed through the first cabin heat exchanger group 58 where cabin air is heated by the coolant. The coolant is then directed through the degas device 72 and the third valve 30 to the input of the second coolant pump 54. The coolant is then pushed by the second coolant pump 54 through the battery cold plate 52 to provide heat to the battery before returning through the first valve 26 and the fourth valve 32 to the input of the third coolant pump 60. The cycle is then repeated. In this manner the cabin air and the battery are warmed as part of a preconditioning process in cold weather. This mode may be initiated, for example, based upon the time of day by instructions provided to the controller 50 through a human machine interface (HMI) of the vehicle or at other times such as when a remote start device of the vehicle is activated. Thus, for example, where a motor vehicle operator leaves for work on work days at 7:15 a.m., the controller may be programmed to commence preconditioning at 7:10 a.m. or other appropriate time.

Consistent with the above description, the integrated thermal management system 10 is useful in a method of integrated thermal management for a vehicle. That method includes the step of providing (a) a coolant circuit 12 having a component thermal conditioning circuit 16, a battery thermal conditioning circuit 18, a cabin heating circuit 20 and a cabin cooling circuit 22 and (b) a valve group 24 configured for selectively interconnecting or isolating the component thermal conditioning circuit, the battery thermal conditioning circuit, the cabin heating circuit and the cabin cooling circuit.

The method may also include the step of providing the component thermal conditioning circuit 16 with a first coolant pump 38, the battery thermal conditioning circuit 18 with a second coolant pump 54, the cabin heating circuit 20 with a third coolant pump 60 and the cabin cooling circuit 22 with a fourth coolant pump 66.

The method may include the step of controlling operation of the valve group 24 with a control module 14. Further, the method may include the step of controlling the operation of the first, second, third and fourth coolant pumps 38, 54, 60 and 66 with the control module 14.

The method may also include providing the first valve 26 between the battery thermal conditioning circuit 18 and the cabin cooling circuit 22 upstream of the cabin cooling circuit and providing the second valve 28 between the battery thermal conditioning circuit and the cabin cooling circuit downstream of the cabin cooling circuit. Still further, the method may include providing the third valve 30 between the battery thermal conditioning circuit 18 and the component thermal conditioning circuit 16 and providing the fourth valve 32 between the battery thermal conditioning circuit 18 and the cabin heating circuit 20. The method may also include using 3-way valves for the first valve 26 and the second valve 28 and 4-way valves for the third valve 30 and the fourth valve 32.

The method may also include configuring the control module 14 to operate the integrated thermal management system 10 in a plurality of different operating modes. This may include providing as many as three cooling modes, a heating mode, a dehumidification and reheat mode and a battery and cabin preconditioning mode.

In a first cooling mode, the method includes isolating the component thermal conditioning circuit 16, the battery thermal conditioning circuit 18, the cabin heating circuit 20 and the cabin cooling circuit 22 from one another by operation of the valve group 24. In a second cooling mode, the method includes isolating the component thermal conditioning circuit 16 and the cabin heating circuit 20, metering coolant through the first valve 26 from the battery thermal conditioning circuit 18 to the cabin cooling circuit 22 and metering the coolant from the cabin cooling circuit back to the battery thermal conditioning circuit through the second valve 28.

In a third cooling mode, the method includes isolating the cabin heating circuit 20, interconnecting the component thermal conditioning circuit 16 and the battery thermal conditioning circuit 18 through the third valve 30 and metering the coolant through the second cabin heat exchanger group 64 by the second valve 28.

In the heating mode, the method includes isolating the cabin heating circuit 20, interconnecting the component thermal conditioning circuit 16 and the battery thermal conditioning circuit 18 and directing coolant from the battery thermal conditioning circuit through the cold source 62 of the cabin cooling circuit 22 without circulating the coolant through the second cabin heat exchanger group 64 of the cabin cooling circuit. Further, the heating mode includes directing the coolant around/by passing the radiator 40 of the component thermal conditioning circuit 16.

In the dehumidification and reheat mode, the method includes isolating the component thermal conditioning circuit 16 and the cabin heating circuit 20, metering the coolant from the battery thermal conditioning circuit 18 to the cabin cooling circuit 22 by the first valve 26 and metering the coolant from the cabin cooling circuit to the battery thermal conditioning circuit by the second valve 28.

In the battery and cabin preconditioning mode, the method includes isolating the component thermal conditioning circuit 16 and the cabin cooling circuit 22 and interconnecting the battery thermal conditioning circuit 18 and the cabin heating circuit 20 with the fourth valve 32. In any of the embodiments, the method may also include the step of using 4-way valves for the third valve 30 and the fourth valve 32.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An integrated thermal management system, comprising:
   a coolant circuit having a component thermal conditioning circuit including a first coolant pump, a battery thermal conditioning circuit including a second coolant pump, a cabin heating circuit including a third coolant pump, a cabin cooling circuit including a fourth coolant pump and a valve group configured for (a) interconnecting one or more of said component thermal conditioning circuit, said battery thermal conditioning circuit, said cabin heating circuit and said cabin cooling circuit or (b) isolating one or more of said component thermal conditioning circuit, said battery thermal conditioning circuit, said cabin heating circuit and said cabin cooling circuit from one another; and
   wherein said valve group includes a first valve between said battery thermal conditioning circuit and said cabin cooling circuit upstream of said cabin cooling circuit and a second valve between said battery thermal conditioning circuit and said cabin cooling circuit downstream of said cabin cooling circuit,
   wherein said valve group includes a third valve between said battery thermal conditioning circuit and said component thermal conditioning circuit,
   wherein said valve group includes a fourth valve between said battery thermal conditioning circuit and said cabin heating circuit,
   wherein said valve group includes a fifth valve in said component thermal conditioning circuit upstream of said radiator and a radiator by pass line of said component thermal conditioning circuit; and
   a controller configured (a) for controlling operation of said valve group, said first coolant pump, said second coolant pump, said third coolant pump and said forth coolant pump and (b) for operating said integrated thermal management system in a plurality of operating modes including a second cooling mode wherein said component thermal conditioning circuit and said cabin heating circuit are isolated from one another and coolant from said battery thermal conditioning circuit is metered through said first valve into said cabin cooling circuit and said coolant from said cabin cooling circuit is metered through said second valve into said battery thermal conditioning circuit.

2. The integrated thermal management system of claim 1, wherein said component thermal conditioning circuit further includes a component group and a radiator, and said component group includes at least one component selected from a first group consisting of an electric drive motor, a DC/DC converter, an on-board charger, an inverter, a LIDAR system, computer electronics and combinations thereof.

3. The integrated thermal management system of claim 2, wherein said battery thermal conditioning circuit further includes a battery cold plate.

4. The integrated thermal management system of claim 3, wherein said cabin heating circuit includes at least one heat source and a first cabin heat exchanger group, wherein said at least one heat source is selected from a second group consisting of a water-cooled condenser, an electric heater, a first thermal storage device and combinations thereof.

5. The integrated thermal management system of claim 4, wherein said cabin cooling circuit includes at least one cold source and a second cabin heat exchanger group wherein said at least one cold source is selected from a third group consisting of a chiller, a second thermal storage device and combinations thereof.

6. The integrated thermal management system of claim 5, wherein said cabin cooling circuit further includes a check valve downstream from said second cabin heat exchanger group.

7. The integrated thermal management system of claim 1, wherein said first valve, said second valve and said fifth valve are 3-way valves and said third valve and said fourth valve are 4-way valves.

8. The integrated thermal management system of claim 1, wherein said coolant circuit further includes a degas device.

9. The integrated thermal management system of claim 1, wherein said plurality of operating modes includes a third cooling mode wherein said cabin heating circuit is isolated from said component thermal conditioning circuit, said battery thermal conditioning circuit and said carbon cooling circuit, said component thermal conditioning circuit and said battery thermal conditioning circuit are interconnected by flow of said coolant through said third valve and said degas device, and said coolant is metered through said cabin cooling circuit by said second valve.

10. The integrated thermal management system of claim 1, wherein said plurality of operating modes includes a heating mode wherein said cabin heating circuit is isolated from said component thermal conditioning circuit, said battery thermal conditioning circuit and said carbon cooling circuit, said component thermal conditioning circuit and said battery thermal conditioning circuit are interconnected and said first valve and said second valve direct said coolant from said battery thermal conditioning circuit through said cold source without circulating coolant through said second cabin heat exchanger group.

11. The integrated thermal management system of claim 1, wherein said plurality of operating modes includes a dehumidification and reheat mode wherein said component thermal conditioning circuit and said cabin heating circuit are isolated from one another and said coolant from said battery thermal conditioning circuit is metered through said first valve into said cabin cooling circuit and said coolant from said cabin cooling circuit is metered through said second valve into said battery thermal conditioning circuit.

12. The integrated thermal management system of claim 1, wherein said plurality of operating modes includes a battery and cabin preconditioning mode wherein said component thermal conditioning circuit and said cabin cooling circuit are isolated from one another and said battery thermal conditioning circuit and said cabin heating circuit are interconnected by said fourth valve.

* * * * *